United States Patent
Whitcomb

(10) Patent No.: US 9,283,623 B2
(45) Date of Patent: *Mar. 15, 2016

(54) NANOWIRE PREPARATION METHODS, COMPOSITIONS, AND ARTICLES

(75) Inventor: David R. Whitcomb, Woodbury, MN (US)

(73) Assignee: Carestream Health, Inc., Rochester, NY (US)

( * ) Notice: Subject to any disclaimer, the term of this patent is extended or adjusted under 35 U.S.C. 154(b) by 593 days.

This patent is subject to a terminal disclaimer.

(21) Appl. No.: 13/449,342

(22) Filed: Apr. 18, 2012

(65) Prior Publication Data

US 2012/0301350 A1    Nov. 29, 2012

Related U.S. Application Data

(60) Provisional application No. 61/488,821, filed on May 23, 2011.

(51) Int. Cl.
| | | |
|---|---|---|
| *B22F 9/16* | (2006.01) | |
| *B22F 9/24* | (2006.01) | |
| *B82Y 40/00* | (2011.01) | |
| *B22F 1/00* | (2006.01) | |
| *B82Y 30/00* | (2011.01) | |

(52) U.S. Cl.
CPC ............... *B22F 9/24* (2013.01); *B22F 1/0025* (2013.01); *B82Y 30/00* (2013.01)

(58) Field of Classification Search
CPC ...................................................... B82Y 40/00
USPC ............................................................. 75/371
See application file for complete search history.

(56) References Cited

U.S. PATENT DOCUMENTS

| | | | | |
|---|---|---|---|---|
| 6,645,444 B2 * | 11/2003 | Goldstein | ......................... | 423/1 |
| 2012/0301350 A1 * | 11/2012 | Whitcomb | ................... | 420/501 |

FOREIGN PATENT DOCUMENTS

JP    2009-155674    7/2009

OTHER PUBLICATIONS

Tang et al. Syntheses of silver nanowires in liquid phase, Nanowires Science and Technology, Feb. 2010, p. 25-42.*
http://en.wikipedia.org/wiki/Aluminium_chloride, Jan. 2013.*
Younan Xia, et al., Shape-Controlled Synthesis of Metal Nanocrystals: Simple Chemistry Meets Complex Physics?, Angew. Chem. Int. Ed. 2009, 48, pp. 60-103.
B. Wiley et al., Polyol synthesis of silver nanoparticles: Use of chloride and oxygen to promote the formation of single-crystal, truncated cubes and tetrahedrons, vol. 4, Issue 9, pp. 1733-1739, Sep. 2004.
Kylee Korte et al., Rapid synthesis of silver nanowires through a CuCl- or $CuCl_2$ -mediated polyol process, Journal of Materials Chemistry, 2008, vol. 18, pp. 437-441.
Jinting Jiu, et al., Preparation of Ag nanorods with high yield by polyol process, Mat. Chem. & Phys., 2009, 114, pp. 333-338.

(Continued)

*Primary Examiner* — Jie Yang
*Assistant Examiner* — Xiaowei Su
(74) *Attorney, Agent, or Firm* — Reed L. Christiansen

(57) ABSTRACT

Nanowire preparation methods, compositions, and articles are disclosed. Such methods which reduce metal ions to metal nanowires in the presence of aluminum or gallium ions, are capable of producing long, narrow, nanowires useful for electronics and optical applications.

7 Claims, 3 Drawing Sheets

(56) References Cited

OTHER PUBLICATIONS

Srichandana Nandikonda, Microwave Assisted Synthesis of Silver Nanorods, M.S. Thesis, Auburn University, Aug. 9, 2010, 59 pages.

Shanthi Muralli et al., Lyotropic liquid crystalline self-assembly in dispersions of silver nanowires and nanoparticles, vol. 26, Issue 13, pp. 11176-11183, Jul. 2010.

Z.C. Li, Sodium chloride assisted synthesis of silver nanowires, IET Micro & Nano Letters, vol. 6, Issue 2, pp. 90-93, Feb. 2011.

Benjamin Wiley et al., Polyol Synthesis of Silver Nanostructures: Control of Product Morphology with Fe(II) or Fe(III) Species, Langmuir, The ACS Journal of Surfaces and Colloids, Aug. 2005, vol. 21, No. 18, pp. 8077-8080.

Hong-Yan Shi et al., Ordering of Disordered Nanowires : Spontaneous Formation of Highly Aligned, Ultralong Ag Nanowire Films at Oil-Water-Air Interface, Advanced. Functional Matererials, vol. 20, 2010, pp. 958-964.

\* cited by examiner

NANOWIRE PREPARATION METHODS, COMPOSITIONS, AND ARTICLES

CROSS REFERENCE TO RELATED APPLICATIONS

This application claims the benefit of U.S. provisional application No. 61/488,821, filed May 23, 2011, entitled NANOWIRE PREPARATION METHODS, COMPOSITIONS, AND ARTICLES, which is hereby incorporated by reference in its entirety.

BACKGROUND

The general preparation of silver nanowires (10-200 aspect ratio) is known. See, for example, Angew. Chem. Int. Ed. 2009, 48, 60, Y. Xia, Y. Xiong, B. Lim, S. E. Skrabalak, which is hereby incorporated by reference in its entirety. Such preparations typically employ $Fe^{2+}$ or $Cu^{2+}$ ions to "catalyze" the wire formation over other morphologies. The controlled preparation of silver nanowires having the desired lengths and widths, however, is not known. For example, the $Fe^{2+}$ produces a wide variety of lengths or thicknesses and the $Cu^{2+}$ produces wires that are too thick for many applications.

When iron or copper are used, they are typically provided as the metal halide salts $FeCl_2$ or $CuCl_2$. See, for example, B. Wiley et al., Nano Letters, 2004, 4, 1733-1739 and K. E. Korte et al., J. Mats. Chem., 2008, 18, 437. Other metal halide salts have been used in nanowire synthesis. See, for example, J. Jiu, K. Murai, D. Kim, K. Kim, K. Suganuma, Mat. Chem. & Phys., 2009, 114, 333, which refers to NaCl, $CoCl_2$, $CuCl_2$, $NiCl_2$ and $ZnCl_2$, and S. Nandikonda, "Microwave Assisted Synthesis of Silver Nanorods," M. S. Thesis, Auburn University, Auburn, Ala., USA, Aug. 9, 2010, which refers to NaCl, KCl, $MgCl_2$, $CaCl_2$, $MnCl_2$, $CuCl_2$, and $FeCl_3$, and Japanese patent application publication 2009-155674, which discloses $SnCl_4$. See also S. Murali et al., Langmuir, 2010, 26(13), 11176-83; Z. C. Li et al., Micro & Nano Letters, 2011, 6(2), 90-93; and B. J. Wiley et al., Langmuir, 2005, 21, 8077. Japanese patent application publication 2009-155674 discloses $SnCl_4$.

SUMMARY

At least a first embodiment provides methods comprising providing at least one second metal or metal ion comprising at least one of an aluminum ion or a gallium ion; and reducing at least one first reducible metal ion to at least one first metal nanowire, where the at least one second metal or metal ion and the at least one first reducible metal ion differ in atomic number. In at least some such embodiments, the reducing the at least one first reducible metal ion occurs in the presence of the at least one second metal or metal ion.

In some cases, the providing the at least one second metal or metal ion comprises providing a composition comprising at least one first compound comprising the at least one first reducible metal ion; at least one second compound comprising the at least one second metal or metal ion; and at least one solvent. In such methods, the at least one second compound may, for example, comprise at least one chloride ion. Gallium (III) chloride and aluminum(III) chloride hexahydrate are exemplary second compounds.

In at least some embodiments, the at least one first reducible metal ion comprises at least of a coinage metal ion or an ion of an element from IUPAC Group 11 or at least one ion of silver.

In at least some embodiments, the at least one second metal or metal ion comprises gallium or an ion of gallium. In other embodiments, the at least one second metal or metal ion comprises aluminum or an ion of aluminum. In some cases, the at least one second metal or metal ion comprises gallium or an ion of gallium or aluminum or an ion of aluminum.

Some embodiments provide the first metal nanowire produced according to such methods.

At least a second embodiment provide a method comprising providing a composition comprising at least one first compound comprising at least one reducible metal ion, at least one second compound comprising at least one second metal or metal ion differing in atomic number from the at least one first reducible metal ion, the second metal or metal ion comprising at least one element from IUPAC Group 13, and at least one solvent; and reducing the at least one first reducible metal ion to at least one first metal. The at least one first reducible metal ion may, for example, comprise at least one coinage metal ion, or at least one ion of an element from IUPAC Group 11, or at least one silver ion. The at least one first compound may, for example, comprise silver nitrate. The at least one second metal or metal ion may, for example, comprise aluminum or an ion of aluminum or gallium or an ion of gallium. The at least one second compound may, for example, comprise at least one chloride, such as, for example, aluminum(III) chloride hexahydrate or gallium(III) chloride. The at least one solvent may, for example, comprise at least one polyol, or at least one of ethylene glycol, propylene glycol, glycerol, one or more sugars, or one or more carbohydrates. In some embodiments, the ratio of the total moles of the at least one second metal or metal ion to the total moles of the at least one first reducible metal ion is from about 0.0001 to about 0.1. The reduction may, for example, be carried out at one or more temperatures from about 120° C. to about 190° C., or from about 90° C. to about 190° C.

In at least some embodiments, the composition further comprises at least one protecting agent. In some cases, the at least one protecting agent comprises at least one of: one or more surfactants, one or more acids, or one or more polar polymers. The at least one protecting agent may, for example, comprise polyvinylpyrrolidinone. At least some embodiments further comprise inerting the at least one protecting agent.

Other embodiments further comprise inerting one or more of the composition, the at least one compound comprising the at least one first reducible metal ion, the at least one second metal or metal ion, or the at least one solvent.

Still other embodiments provide the at least one first metal produced by such methods and articles comprising such at least one first metal.

Such at least one first metal may, for example, comprise one or more nanowires, nanocubes, nanorods, nanopyramids, nanotubes, and the like. Such at least one first metal may comprise at least one object having an average diameter of between 10 nm and about 500 nm, or having an aspect ratio from about 50 to about 10,000.

Yet still other embodiments provide at least one metal nanowire with an average diameter between about 10 nm and about 150 nm, with an aspect ratio from about 50 to about 10,000. Such nanowires may, for example, comprise at least one coinage metal, or at least one element of IUPAC Group 11, or silver. Yet another embodiment comprises at least one article comprising such metal nanowires, such as, for example, at least one electronic device.

These embodiments and other variations and modifications may be better understood from the brief description of figures, description, exemplary embodiments, examples, figures, and claims that follow. Other desirable objectives and advantages inherently achieved may occur or become apparent to those skilled in the art. The invention is defined by the appended claims.

DESCRIPTION

Figure 1:
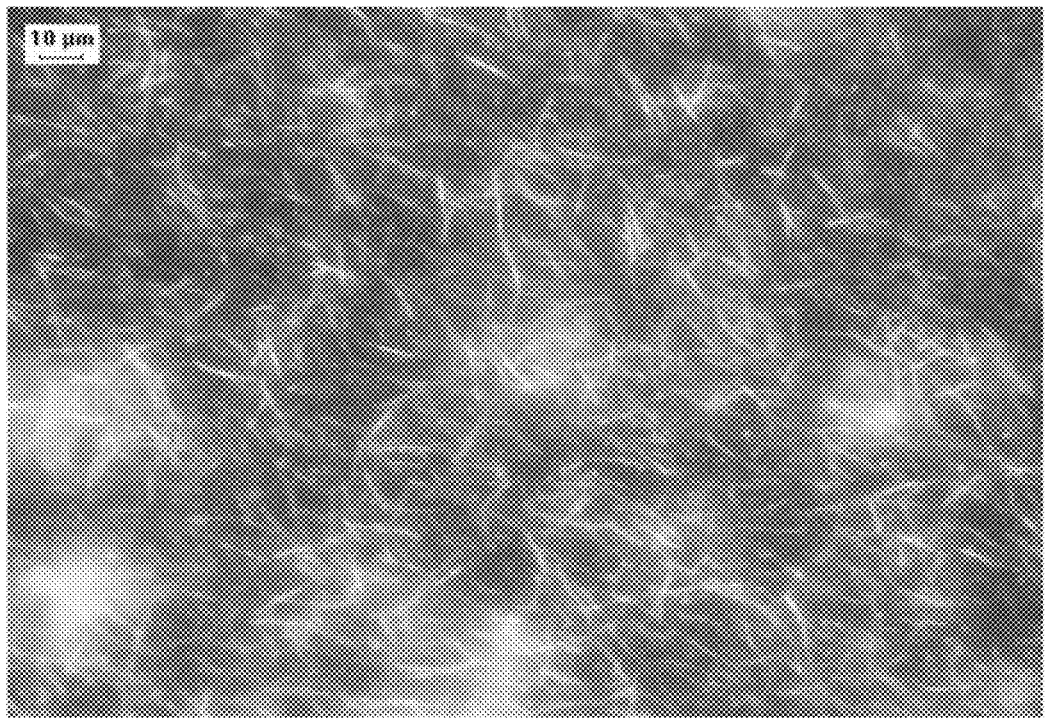
FIG. 1 shows an optical micrograph of the silver nanowire product of Example 1.

All publications, patents, and patent documents referred to in this document are incorporated by reference herein in their entirety, as though individually incorporated by reference.

U.S. provisional application No. 61/488,821, filed May 23, 2011, entitled NANOWIRE PREPARATION METHODS, COMPOSITIONS, AND ARTICLES, is hereby incorporated by reference in its entirety.

Reducible Metal Ions and Metal Products

Some embodiments provide methods comprising reducing at least one reducible metal ion to at least one metal. A reducible metal ion is a cation that is capable of being reduced to a metal under some set of reaction conditions. In such methods, the at least one first reducible metal ion may, for example, comprise at least one coinage metal ion. A coinage metal ion is an ion of one of the coinage metals, which include copper, silver, and gold. Or such a reducible metal ion may, for example, comprise at least one ion of an IUPAC Group 11 element. IUPAC Group 11 elements are sometimes referred to as Group IB elements, based on historic nomenclature. An exemplary reducible metal ion is a silver cation. Such reducible metal ions may, in some cases, be provided as salts. For example, silver cations might, for example, be provided as silver nitrate.

In such embodiments, the at least one metal is that metal to which the at least one reducible metal ion is capable of being reduced. For example, silver would be the metal to which a silver cation would be capable of being reduced.

Nanostructures, Nanostructures, and Nanowires

In some embodiments, the metal product formed by such methods is a nanostructure, such as, for example, a one-dimensional nanostructure. Nanostructures are structures having at least one "nanoscale" dimension less than 300 nm, and at least one other dimension being much larger than the nanoscale dimension, such as, for example, at least about 10 or at least about 100 or at least about 200 or at least about 1000 times larger. Examples of such nanostructures are nanorods, nanowires, nanotubes, nanopyramids, nanoprisms, nanoplates, and the like. "One-dimensional" nanostructures have one dimension that is much larger than the other two dimensions, such as, for example, at least about 10 or at least about 100 or at least about 200 or at least about 1000 times larger.

Such one-dimensional nanostructures may, in some cases, comprise nanowires. Nanowires are one-dimensional nanostructures in which the two short dimensions (the thickness dimensions) are less than 300 nm, preferably less than 100 nm, while the third dimension (the length dimension) is greater than 1 micron, preferably greater than 10 microns, and the aspect ratio (ratio of the length dimension to the larger of the two thickness dimensions) is greater than five. Nanowires are being employed as conductors in electronic devices or as elements in optical devices, among other possible uses. Silver nanowires are preferred in some such applications.

Such methods may be used to prepare nanostructures other than nanowires, such as, for example, nanocubes, nanorods, nanopyramids, nanotubes, and the like. Nanowires and other nanostructure products may be incorporated into articles, such as, for example, electronic displays, touch screens, portable telephones, cellular telephones, computer displays, laptop computers, tablet computers, point-of-purchase kiosks, music players, televisions, electronic games, electronic book readers, transparent electrodes, solar cells, light emitting diodes, other electronic devices, medical imaging devices, medical imaging media, and the like.

Preparation Methods

A common method of preparing nanostructures, such as, for example, nanowires, is the "polyol" process. Such a process is described in, for example, *Angew. Chem. Int. Ed.* 2009, 48, 60, Y. Xia, Y. Xiong, B. Lim, S. E. Skrabalak, which is hereby incorporated by reference in its entirety. Such processes typically reduce a metal cation, such as, for example, a silver cation, to the desired metal nanostructure product, such as, for example, a silver nanowire. Such a reduction may be carried out in a reaction mixture that may, for example, comprise one or more polyols, such as, for example, ethylene glycol (EG), propylene glycol, butanediol, glycerol, sugars, carbohydrates, and the like; one or more protecting agents, such as, for example, polyvinylpyrrolidinone (also known as polyvinylpyrrolidone or PVP), other polar polymers or copolymers, surfactants, acids, and the like; and one or more metal ions. These and other components may be used in such reaction mixtures, as is known in the art. The reduction may, for example, be carried out at one or more temperatures from about 90° C. to about 190° C.

Aluminum Ions or Gallium Ions

Applicant has discovered that aluminum ions or gallium ions, such as $Al^{3+}$ or $Ga^{3+}$, can be used to prepare silver nanowires. It is believed that other metal ion oxidation states, such as, for example, 1+ or 2+, may also provide useful results. It is notable that use of indium as $In^{3+}$, which is next heavier member of IUPAC Group 13, resulted in production of only microparticles, rather than nanowires.

These methods are also believed to be applicable to reducible metal cations other than silver cations, including, for example, reducible cations of other IUPAC Group 11 elements, reducible cations of other coinage metals, and the like. The methods may also be used to prepare products other than nanowires, such as, for example, nanocubes, nanorods, nanopyramids, nanotubes, and the like. Such products may be incorporated into articles, such as, for example, transparent electrodes, solar cells, light emitting diodes, other electronic devices, medical imaging devices, medical imaging media, and the like.

EXEMPLARY EMBODIMENTS

U.S. provisional application No. 61/488,821, filed May 23, 2011, entitled NANOWIRE PREPARATION METHODS, COMPOSITIONS, AND ARTICLES, which is hereby incorporated by reference in its entirety, disclosed the following 27 non-limiting exemplary embodiments:

A. A method comprising:
 providing a composition comprising:
  at least one first compound comprising at least one first reducible metal ion;
  at least one second compound comprising at least one second metal or metal ion differing in atomic number from said at least one first reducible metal, said at least one second metal or metal ion comprising at least one element from IUPAC Group 13; and
at least one solvent; and
reducing the at least one first reducible metal ion to at least one first metal.

B. The method of embodiment A, wherein the composition further comprises at least one protecting agent.

C. The method of embodiment B, wherein the at least one protecting agent comprises at least one of: one or more surfactants, one or more acids, or one or more polar polymers.

D. The method of embodiment B, wherein the at least one protecting agent comprises polyvinylpyrrolidinone.

E. The method of embodiment B, further comprising inerting the at least one protecting agent.

F. The method of embodiment A, wherein the at least one first reducible metal ion comprises at least one coinage metal ion.

G. The method of embodiment A, wherein the at least one first reducible metal ion comprises at least one ion of an element from IUPAC Group 11.

H. The method of embodiment A, wherein the at least one first reducible metal ion comprises at least one ion of silver.

J. The method of embodiment A, wherein the at least one first compound comprises silver nitrate.

K. The method of embodiment A, wherein the at least one second metal or metal ion comprises gallium or an ion of gallium.

L. The method of embodiment A, wherein the at least one second compound comprises at least one chloride.

M. The method of embodiment A, wherein the at least one second compound comprises gallium(III) chloride.

N. The method of embodiment A, wherein the at least one solvent comprises at least one polyol.

P. The method of embodiment A, wherein the at least one solvent comprises at least one of: ethylene glycol, propylene glycol, glycerol, one or more sugars, or one or more carbohydrates.

Q. The method of embodiment A, wherein the composition has a ratio of the total moles of the at least one second metal or metal ion to the total moles of the at least one first reducible metal ion from about 0.0001 to about 0.1.

R. The method of embodiment A, wherein the reduction is carried out at one or more temperatures from about 120° C. to about 190° C.

S. The method of embodiment A, further comprising inerting one or more of: the composition, the at least one compound comprising the at least one first reducible metal ion, the at least one second metal or metal ion, or the at least one solvent.

T. The at least one first metal produced according to the method of embodiment A.

U. At least one article comprising the at least one first metal produced according to the method of embodiment A.

V. The at least one article of embodiment U, wherein the at least one first metal comprises one or more nanowires, nanocubes, nanorods, nanopyramids, or nanotubes.

W. The at least one article of embodiment U, wherein the at least one first metal comprises at least one object having an average diameter of between about 10 nm and about 500 nm.

X. The at least one article of embodiment U, wherein the at least one first metal comprises at least one object having an aspect ratio from about 50 to about 10,000.

Y. At least one metal nanowire with an average diameter of between about 10 nm and about 150 nm, and with an aspect ratio from about 50 to about 10,000.

Z. The nanowire of embodiment Y, wherein the at least one metal nanowire comprises at least one coinage metal.

AA. The nanowire of embodiment Y, wherein the at least one metal nanowire comprises at least one element of IUPAC Group 11.

AB. The nanowire of embodiment Y, wherein the at least one metal nanowire comprises silver.

AC. At least one article comprising the at least one metal nanowire of embodiment Y.

EXAMPLES

Example 1

To a 500 mL reaction flask containing 280 mL ethylene glycol (EG) was added at room temperature 1.0 g of a freshly prepared solution of 27 mM $GaCl_3$ in EG. This solution was stripped of at least some dissolved gases by bubbling $N_2$ into the solution for at 60 min using a glass pipette at room temperature with mechanical stirring while at 100 rpm. (This operation will be referred to as "degassing" the solution in the sequel.) Solutions of 0.77 M polyvinylpyrrolidinone (PVP) in EG and 0.25M $AgNO_3$ in EG were also degassed with nitrogen for 60 minutes, then 20 mL syringes of each were prepared. The reaction mixture was heated to 145° C. under nitrogen blanketing, then the $AgNO_3$ and PVP solutions were added at a constant rate over 25 minutes via a 12 gauge a TEFLON® fluoropolymer syringe needle. The reaction was held at 145° C. for 90 minutes, and then allowed to cool to ambient temperature.

The cooled reaction mixture was diluted with an equal volume of acetone, then centrifuged at 500 G for 45 minutes. The decanted solid was then res-dispersed in 200 mL of isopropanol, shaken for 10 minutes, then centrifuged and decanted again, followed by dilution with 15 mL isopropanol.

Figure 2:
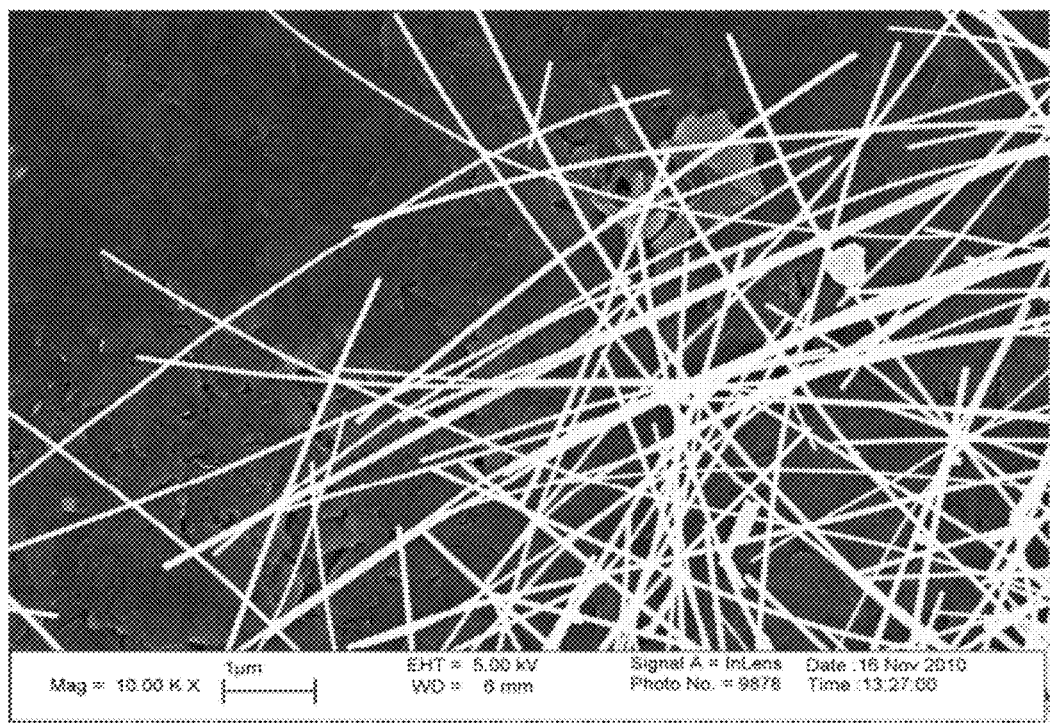
FIG. 2 shows a scanning electron micrograph of the purified silver nanowire product of Example 1.

An optical microscope picture of the unpurified silver nanowire product is shown in FIG. 1. A scanning electron microscope image of the purified silver nanowire product is shown in FIG. 2. The silver nanowires had an average diameter of 52.2±12.6 nm and an average length of 8.5±3.1 μm.

Example 2

To a 500 mL reaction flask was added 280 mL ethylene glycol (EG) and 1.3 g of freshly prepared 15 mM $AlCl_3.6H_2O$ in EG. This solution was degassed for at least 2 hrs using a glass pipette at room temperature with mechanical stirring while at 100 rpm. Stock solutions of 0.25 M $AgNO_3$ in EG and 0.77 M polyvinylpyrrolidinone (PVP) in EG were also degassed by bubbling $N_2$ into the solutions for 60 minutes. Two syringes were loaded with 20 mL each of the $AgNO_3$ and PVP solutions. The reaction mixture was heated to 155° C. under $N_2$ and the $AgNO_3$ and PVP solutions were added at a constant rate over 25 minutes via 12 gauge TEFLON® fluoropolymer syringe needles. The reaction was held at 155° C. for 90 minutes then allowed to cool to room temperature. From the cooled mixture, the reaction mixture was diluted by an equal volume of acetone, and centrifuged at 500 G for 45 minutes. The decanted solid was re-dispersed in 200 mL isopropanol, shaken 10 minutes and centrifuged again, decanted and diluted with 15 mL isopropanol.

Figure 3:
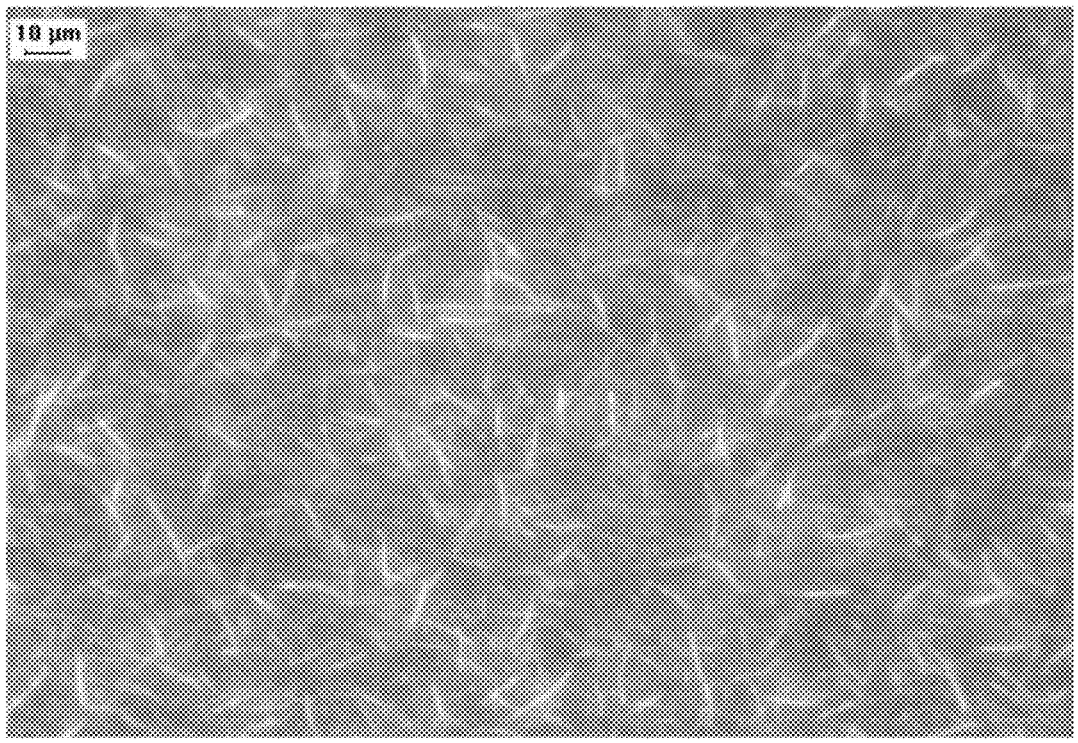
FIG. 3 shows an optical micrograph of the silver nanowire product of Example 2.

FIG. 3 shows an optical micrograph of the silver nanowire product. The nanowires exhibited an average diameter of 50.0±12.1 nm and an average length of 7.4±2.8 μm, based on measurement of at least 100 wires.

Example 3

Comparative

To a 500 mL reaction flask was added 280 mL ethylene glycol (EG) and 2.3 g of freshly prepared 8.5 mM $InCl_3 \cdot 4H_2O$ in EG. This solution was degassed for 2 hrs using a glass pipette at room temperature with mechanical stirring while at 100 rpm. Stock solutions of 0.25 M $AgNO_3$ in EG and 0.84 M polyvinylpyrrolidinone (PVP) in EG were also degassed by bubbling $N_2$ into the solutions for at least 60 minutes. Two syringes were loaded with 20 mL each of the $AgNO_3$ and PVP solutions. The reaction mixture was heated to 155° C. under $N_2$ and the $AgNO_3$ and PVP solutions were added at a constant rate over 25 minutes via 12 gauge TEFLON® fluoropolymer syringe needles. The reaction was held at 155° C. for 90 minutes then allowed to cool to room temperature.

No nanowires were found in the reaction product, only microparticles.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed:

1. A method comprising:
   providing a composition comprising at least one first compound comprising at least one silver ion, the at least one first compound being a salt; at least one second compound comprising at least one second metal or metal ion comprising at least one of an aluminum ion or a gallium ion; and at least one solvent; and
   reducing the at least one silver ion to at least one silver nanowire,
   wherein the at least one second metal or metal ion and the at least one silver ion differ in atomic number, and further wherein the ratio of the total moles of the at least one second metal or metal ion to the total moles of the at least one silver ion is from 0.0001 to 0.1.

2. The method of claim 1, wherein the at least one second compound comprises at least one chloride ion.

3. The method of claim 1, wherein the at least one second compound comprises gallium(III) chloride.

4. The method of claim 1, wherein the at least one second compound comprises aluminum(III) chloride hexahydrate.

5. The method of claim 1, wherein the reducing the at least one silver ion occurs in the presence of the at least one second metal or metal ion.

6. The method of claim 1, wherein the at least one second metal or metal ion comprises gallium or an ion of gallium.

7. The method of claim 1, wherein the at least one second metal or metal ion comprises aluminum or an ion of aluminum.

\* \* \* \* \*